United States Patent [19]

Yamamoto

[11] Patent Number: 5,283,683
[45] Date of Patent: Feb. 1, 1994

[54] WINDSHIELD VISOR

[76] Inventor: Ray Yamamoto, 5801 Ashue Rd., Wapato, Wash. 98951

[21] Appl. No.: 936,352

[22] Filed: Aug. 25, 1992

[51] Int. Cl.⁵ .................. G02B 26/02; G02B 7/18; B60J 3/00
[52] U.S. Cl. .................................. 359/229; 359/227; 359/844; 296/97.8
[58] Field of Search ............... 359/227, 229, 230, 507, 359/511–514, 600–614, 838–844, 870, 871, 879, 891–894; 296/97.1–97.9, 97.11–97.13

[56] References Cited

U.S. PATENT DOCUMENTS

| | | | |
|---|---|---|---|
| 3,588,233 | 6/1971 | Lambert | 359/844 |
| 3,948,554 | 4/1976 | Barbee | 296/97.6 |
| 4,023,855 | 5/1977 | Janata et al. | 296/97.6 |
| 4,623,188 | 11/1986 | Juraschek et al. | 296/97.5 |
| 4,736,979 | 4/1988 | Harvey | 296/97.8 |
| 4,792,176 | 12/1988 | Karford | 296/97.6 |
| 5,067,764 | 11/1991 | Lanser et al. | 296/97.8 |
| 5,206,764 | 4/1993 | Lamoglia | 359/844 |

Primary Examiner—Bruce Y. Arnold
Assistant Examiner—Thong Nguyen
Attorney, Agent, or Firm—Stratton Ballew Richardson

[57] ABSTRACT

A windshield visor or visor attachment having a fixed panel and an extendible panel which may be opaque, mirrored, transparent, tinted or photogray. The extendible panel protects the driver against glare or brightness, and against direct effects of the defrost/defog fan. The extendible panel may be positioned by means of rods on the extendible panel cooperating with opposed serrations on the fixed panel, or by means of a detent on the first panel cooperating with cutouts in one edge of the movable panel. Three different methods of attaching this invention to a conventional windshield visor are disclosed.

6 Claims, 7 Drawing Sheets

WINDSHIELD VISOR

TECHNICAL FIELD

The present invention relates to a new windshield visor or visor attachment for vehicles. The new visor incorporates a vertically slidable section which can be extended from a rigid frame. The slidable section can be either transparent, opaque, mirrored, shaded, or photogray. The slidable section can be removable from, or permanently slidably attached to, the rigid frame. Used in conjunction with a fastening means, the new visor can be attached to, and modify, existing windshield visors, or can completely replace existing windshield visors.

BACKGROUND OF THE INVENTION

The problem to overcome is the inadequate performance of existing windshield visors for vehicles such as automobiles, trucks, boats, aircraft and all other vehicles which use windshield visors. In conditions of extreme glare or brightness, conventional existing visors cannot safely cover enough of the vehicle operator's or passenger's field of vision to provide adequate assistance. Also, depending upon the direction of travel, and the sun's location, a vehicle operator or passenger can be subjected to extreme glare from the hood of a car or truck, or from the portion of a boat deck extending fore of the windshield. Extreme glare or brightness can also be caused by the reflection of the sun off the roadway, waterway, or runway on which the vehicle is traveling. Also, vehicle operators and passengers can encounter conditions of extreme glare or brightness when looking at traffic signals or signs which are in a direct line of sight with the sun. Conventional windshield visors cannot safely be used by a vehicle operator or passenger to compensate for these types of glare or brightness.

An additional use of windshield visors is to protect the eyes of vehicle operators and passengers from dryness and foreign particulate material when operating a windshield defrost/defog fan. This is particularly important for vehicle operators who wear contacts. As compared to conventional visors, the new visor provides substantial additional protection for vehicle operators by acting as an interior "windshield," protecting the vehicle operator from the defrost/defog fan's airflow.

A further use of the new visor is to provide vehicle operators and passengers with a retractable mirror for existing windshield visors which do not provide mirrors.

BRIEF SUMMARY OF THE INVENTION

This new windshield visor consists primarily of an opaque rigid frame from which a vertically slidable section can be extended, thus substantially increasing the length of the windshield visor. The slidable section can be comprised of transparent, opaque, shaded, mirrored, or photogray material. Part or all of the rigid frame can be also be comprised of transparent, opaque, shaded, mirrored, or photogray material. The slidable section is held in place by the friction between the slidable section and the rigid frame, and also by various devices which retain the slidable section at various fixed lengths of extension. The slidable section can be permanently slidably attached to the rigid frame, or can be configured to be removable from the rigid frame. The removable slidable sections can be exchanged for a different slidable section with different characteristics, depending upon the traveling conditions, e.g., a shaded slidable section may be exchanged for an opaque or mirrored slidable section. Multiple stops placed in the both the rigid frame and the slidable section prevent the slidable section from being removed from the rigid frame by extending the slidable section downward.

It is an object of the present invention to provide vehicle operators and passengers with an adjustable windshield visor offering additional visual protection from glare or brightness.

It is a further object of the present invention to provide vehicle operators with an adjustable windshield visor offering additional protection from dryness and foreign particulate matter resulting from the use of windshield defrost/defog fans.

It is a further object of this invention to provide vehicle operators and passengers with a vertically extendable windshield visor mirror.

It is also an object of this invention to provide an adjustable windshield visor which can be retrofitted to an existing windshield visor.

The present invention achieves these and other objectives which will become apparent from the description that follows, by providing an adjustable windshield visor which includes at least a rigid frame and a vertically slidable section.

In a preferred embodiment of the invention, the new visor is attached by a fastening means to existing vehicle windshield visors, and used in conjunction with those existing visors.

In an additional preferred embodiment of the invention, the new visor replaces existing visors.

An additional alternative embodiment in accordance with the present invention provides a method for modifying existing windshield visors. In this method of alternative preferred embodiment, the combination of fastening means, rigid frame, and vertically slidable section is determined which will result in the retrofitted existing visor with the desired characteristics.

In another alternative preferred embodiment the present invention provides a method for modifying the characteristics of new visors which have replaced existing visors. In this method of alternative preferred embodiment, the combination of rigid frame and vertically slidable section is determined which will result in the new visor with the desired characteristics.

DETAILED DESCRIPTION OF THE INVENTION

The preferred embodiment of this invention is illustrated in FIGS. 1-4. A conventional windshield visor 10 is pivotally attached to rod 12 which extends through the visor 10 immediately below top edge 14. Rod 12 is formed into bend 16, and element 18 of rod 12 is pivotally attached to bracket 20 which is secured to the automobile body frame (not shown). Visor 10 is rectangular, and has left edge 22, right edge 24 and bottom edge 26.

Figures 1, 4:
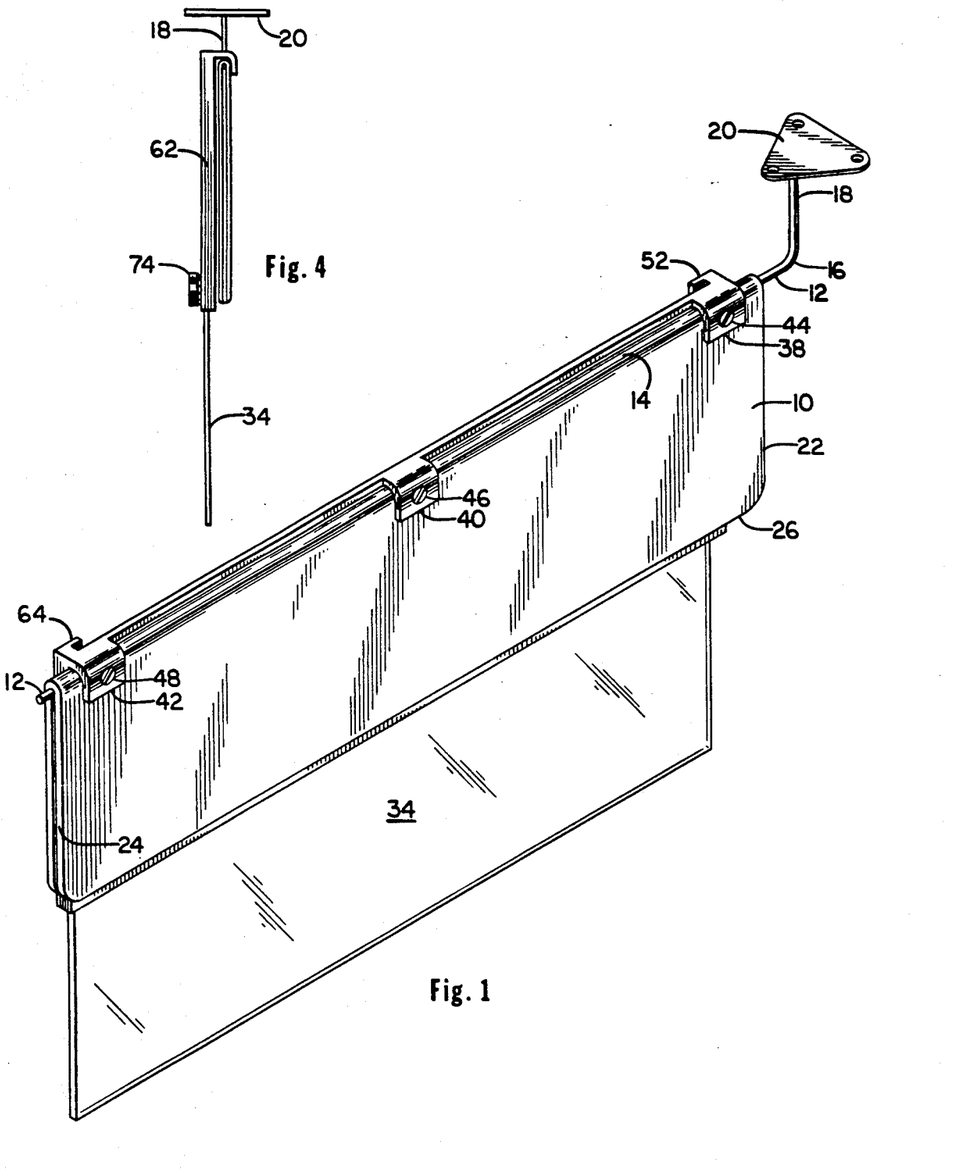
FIG. 1 is a perspective view of a conventional visor with the attachment of the preferred embodiment of this invention secured in place, with the movable panel fully extended.
FIG. 4 is a side elevation view of the combined conventional visor and the attachment of FIG. 1.
Figures 2, 3:
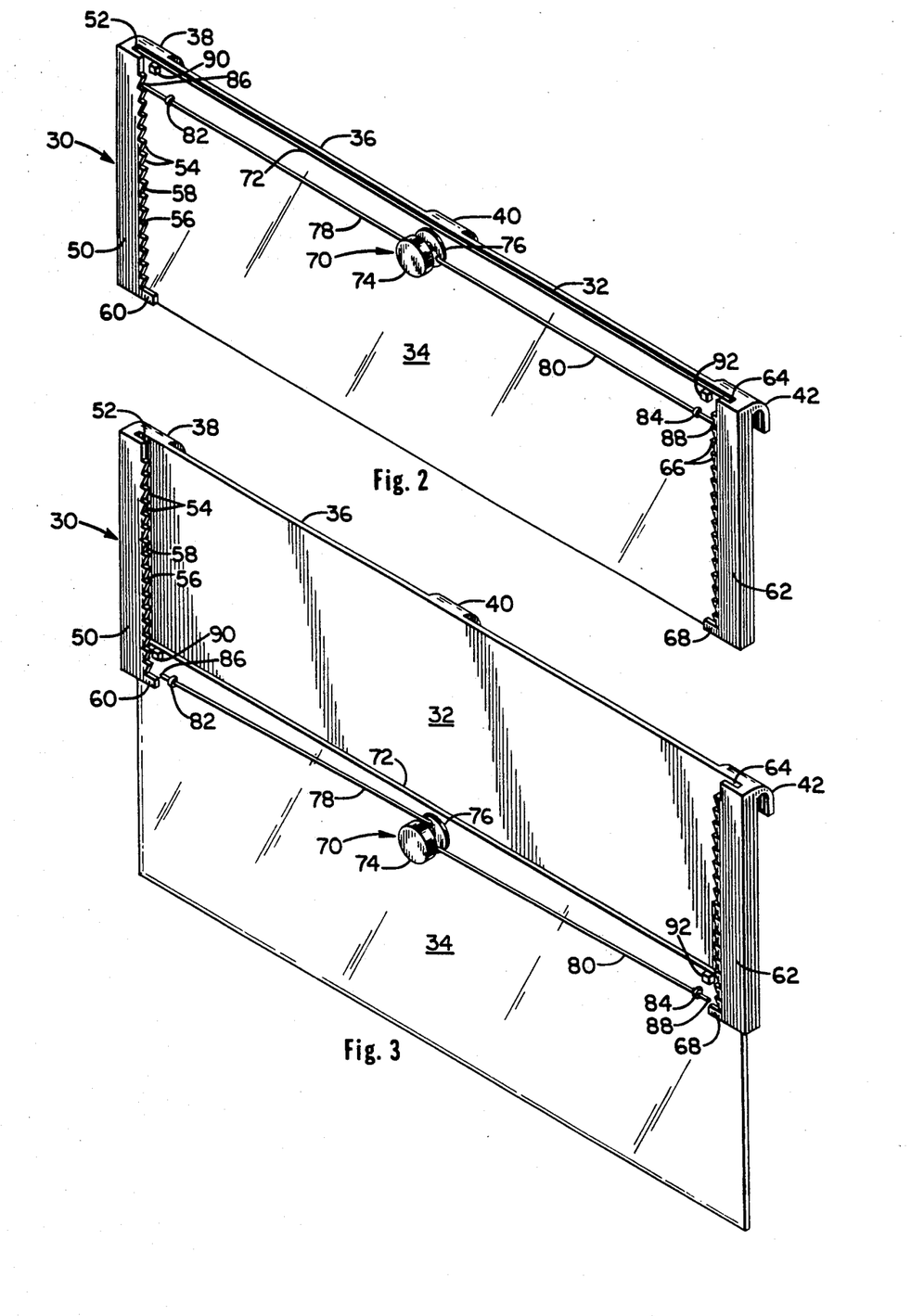
FIG. 2 is a perspective view of the attachment only of FIG. 1 with the movable panel fully retracted.
FIG. 3 is a perspective view of the attachment only of FIG. 1 with the movable panel fully extended.

The attachment 30 comprises a fixed panel 32 and a slidable panel 34. Upper edge 36 of fixed panel 32 has three identical curved attachment brackets 38, 40 and 42 extending outward and then downward, in the same direction, from upper edge 36. Each of the brackets 38, 40 and 42 has a passageway (not shown) through which screws 44, 46 and 48 are placed. Screws 44, 46 and 48 penetrate the conventional visor 10 just below rod 12, and are screwed into threaded holes (not shown) in fixed panel 32. The attachment 30 is thus fixedly secured to visor 10. Referring to FIGS. 2 and 3, at the left end of fixed panel 32, a serrated element 50 extends inwardly from the end of fixed panel 32 parallel to fixed panel 32 and forming a slot 52. Serrations 54 are formed so as to have horizontal lower edges 56 and angular upper edges 58. Shelf 60 extends further inwardly than do serrations 54.

Referring again to FIGS. 2 and 3, it will be seen that at the right end of fixed panel 32, a serrated element 62 extends inwardly from the end of fixed panel 32 parallel to fixed panel 32 and forming a slot 64. Serrations 66 are formed similarly to serrations 54, having horizontal lower edges and angular upper edges. Shelf 68 extends further inwardly than do serrations 66.

Control knob 70 is pivotally attached to slidable panel 34 just below the top edge 72 of slidable panel 34. Control knob 70 comprises cylindrical knurled element 74 and spaced-apart circular element 76. Engagement rod 78 is pivotally attached to circular element 76 near the outer edge thereof. Engagement rod 80 is pivotally attached to circular element 76 opposite to the attachment point of engagement rod 78. U-shaped bracket 82 slidably supports engagement rod 78 near the free end thereof. U-shaped bracket 84 slidably supports engagement rod 80 near the outer end thereof. The length of engagement rods 78 and 80 is such that when control knob 70 is turned to the position shown in FIG. 2, the ends 86 and 88 of engagement rods 78 and 80 respectively will engage the serrations 54 and 66, respectively.

Slidable panel 34 is provided with projections 90 and 92 which are so placed that when slidable panel 34 is moved downward, and engagement rods 78 and 80 are fully retracted, projections 90 and 92 will come to rest on shelf 60 and shelf 68 respectively.

By use of control knob 70, a slidable panel 34, which may be transparent, opaque, mirrored, tinted or photogray, for example, may be extended downward from the conventional visor to protect the driver's eyes from glare or brightness, and/or to protect the driver from the effects of windshield defrost/defog fans.

A second embodiment of the windshield visor attachment is illustrated in FIGS. 5-8. The visor attachment, indicated generally as 100, has a fixed attachment panel 102 and a slidable panel 104, which is slidable within grooves 106 and 108 at opposite ends of fixed panel 102. Brackets 110 and 112 extend outward and downward from opposite ends of upper edge 114 of fixed panel 102. Bracket 110 is provided with slot 114, and bracket 112 is provided with slot 116. Flexible elastic strap 118 is secured at its first end to bracket 110 through slot 114. Flexible elastic strap 120 is secured at its first end to bracket 112 through slot 116. Wide metal hook 122 is secured to the second end of strap 118. Wide metal hook 124 is secured to the second end of strap 120. Flat element 126 extends outward from the surface of fixed panel 102 at the lower left corner as viewed in FIG. 7. Rounded, spaced-apart, parallel tabs 128 and 130 extend outwardly from flat element 126. Pin 132 is secured to tabs 128 and 130 and spans the space between them. Similarly, flat element 134 extends outward from the surface of fixed panel 102 at the lower right corner as viewed in FIG. 7. Rounded, spaced-apart, parallel tabs 136 and 138 extend outwardly from flat element 134. Pin 140 is secured to tabs 136 and 138 and spans the space between them. In order to secure visor attachment 100 to the conventional visor (not shown), brackets 110 and 112 are placed over the upper edge of the conventional visor, and straps 118 and 120 are secured to pins 132 and 140 respectively by means of hooks 122 and 124 respectively.

Figures 5, 6, 12:
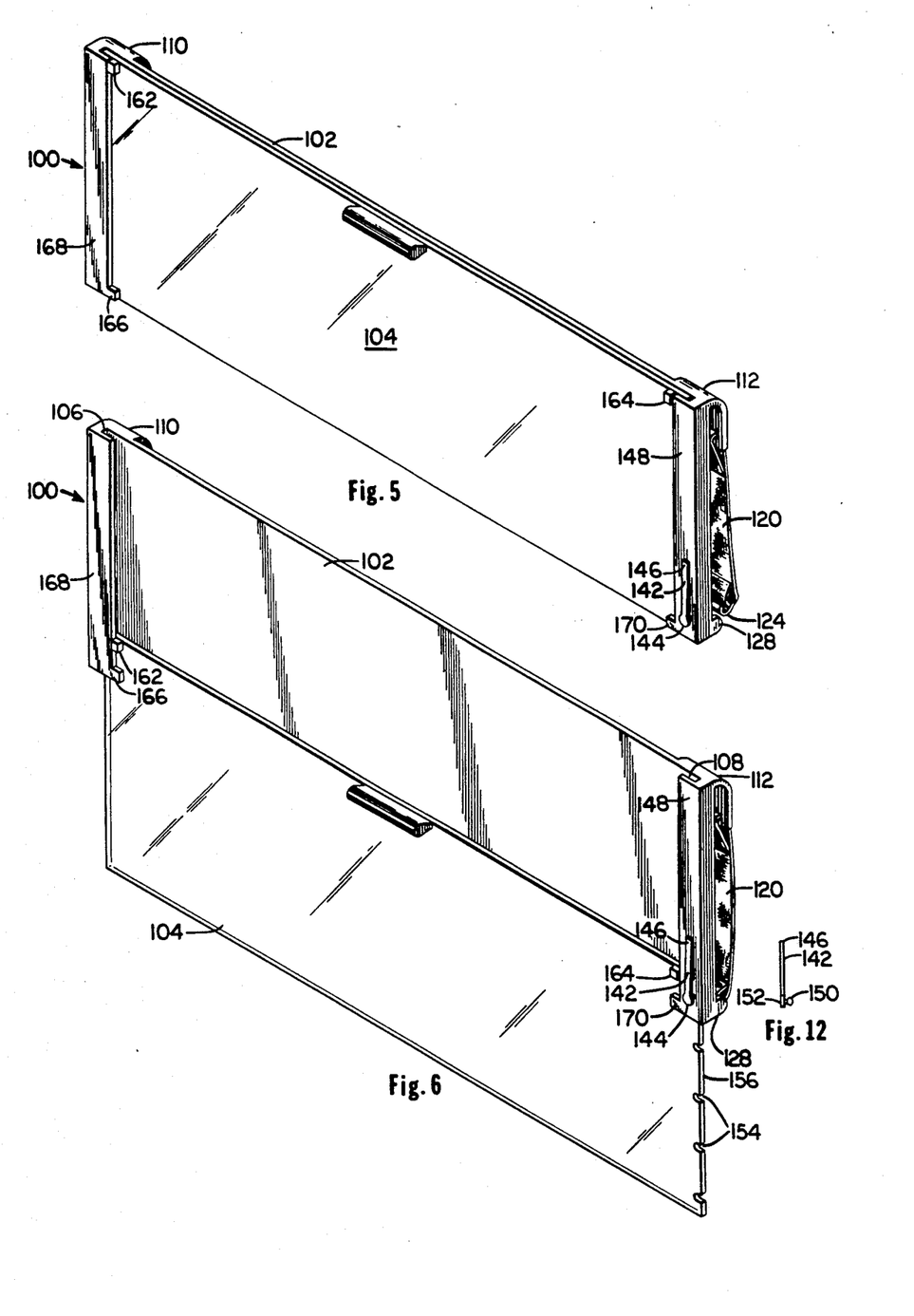
FIG. 5 is a perspective view of a second embodiment of the visor attachment of this invention with the movable panel fully retracted.
FIG. 6 is a perspective view of a second embodiment of the visor attachment of this invention with the movable panel fully extended.
FIG. 12 is a perspective view of a shop clip having a detent.
Figure 7:
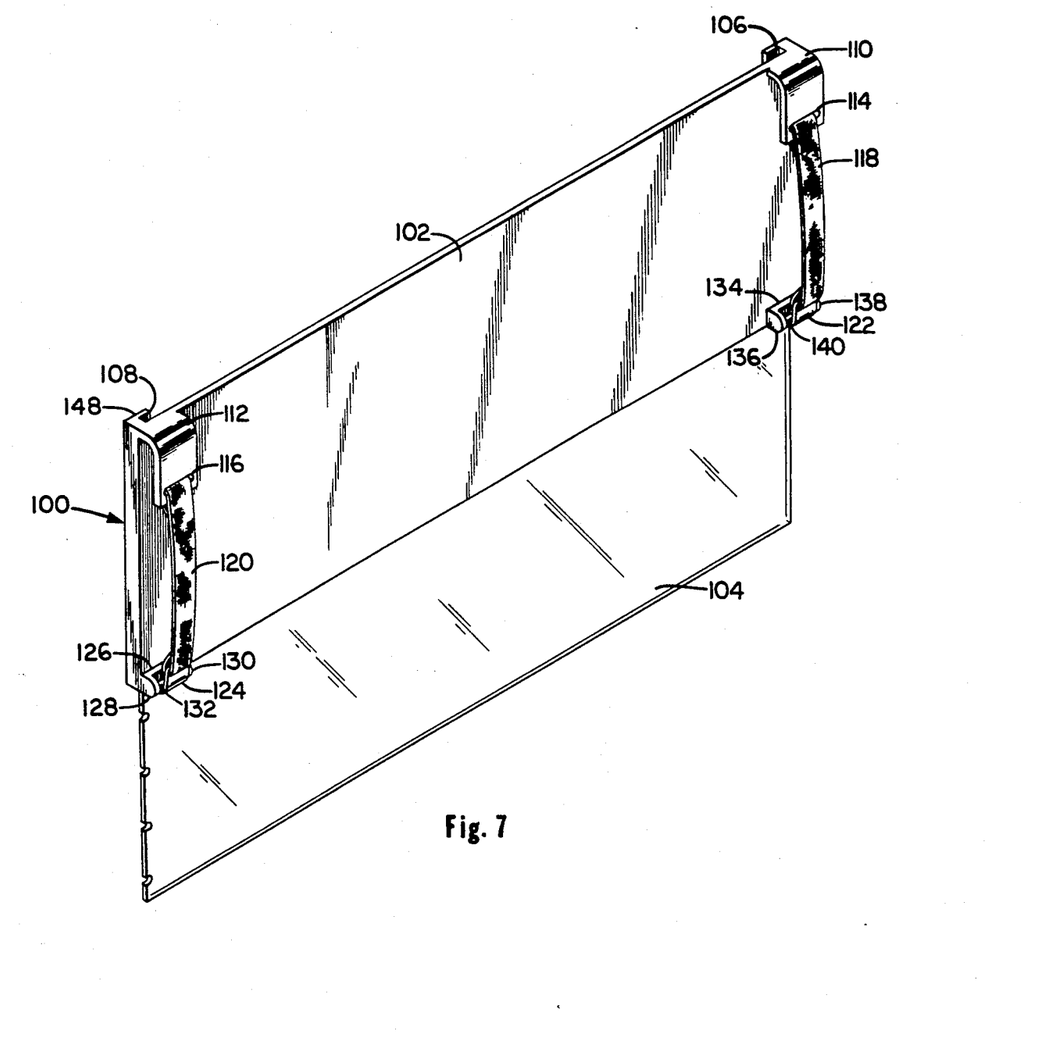
FIG. 7 is a perspective view of the non-operating side of the second embodiment illustrating the method of attachment to a conventional visor.
Figure 8:
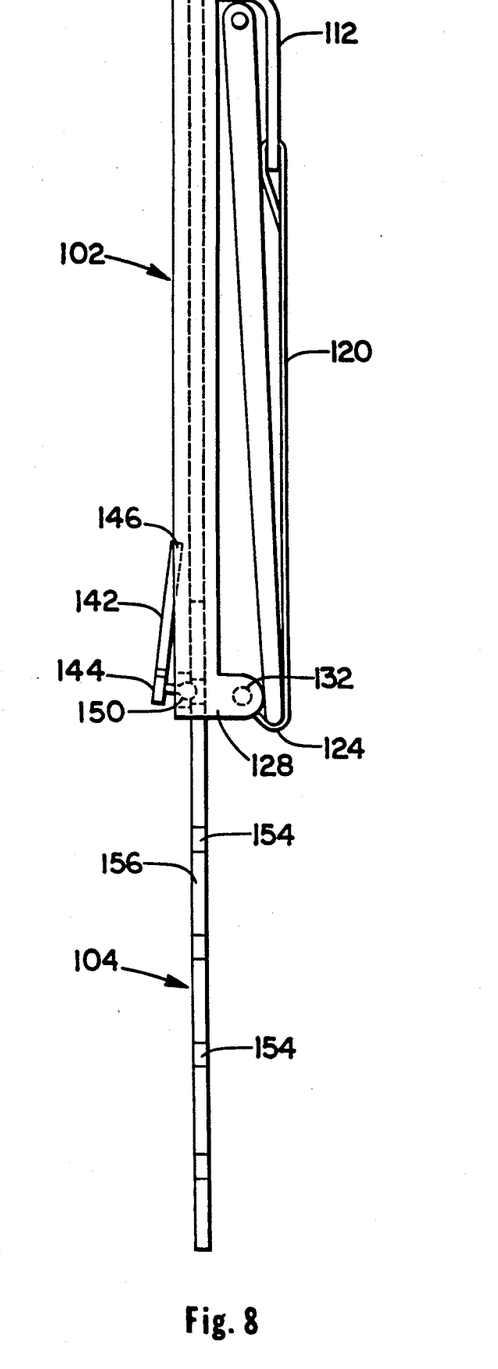
FIG. 8 is a side elevation of the second embodiment attached to a conventional visor, and showing some parts in phantom.

Flexible stop clip 142 having a rounded lower end 144 is secured at end 146 within an opening in flange 148 of fixed panel 102. A spherical detent 150 projects inwardly from lower end 152 of clip 142. Slidable panel 104 is provided with cutouts 154 which are evenly spaced apart along edge 156 of slidable panel 104. Clip 142 is so located as to enable spherical detent 150 to be partly engageable within cutouts 154 as slidable panel 104 moves within slots 106 and 108. Handle 158 projects outwardly from upper edge of 160 of slidable panel 104. Normal upward or downward pressure, as appropriate, is all that is needed to disengage a cutout 154 from engagement with detent 150 in clip 142, and allow the operator to move slidable panel to a different position. Stops 162 and 164 project outwardly from the surface of slidable panel 104 near its upper corners as indicated in FIGS. 5 and 6. Shelf 166 projects from the lower end of flange 168 of fixed panel 102. Shelf 170 projects from the lower end of flange 148. At the lower end of travel of slidable panel 104, stop 162 rests on shelf 166, and stop 164 rests on shelf 170.

Figure 9:
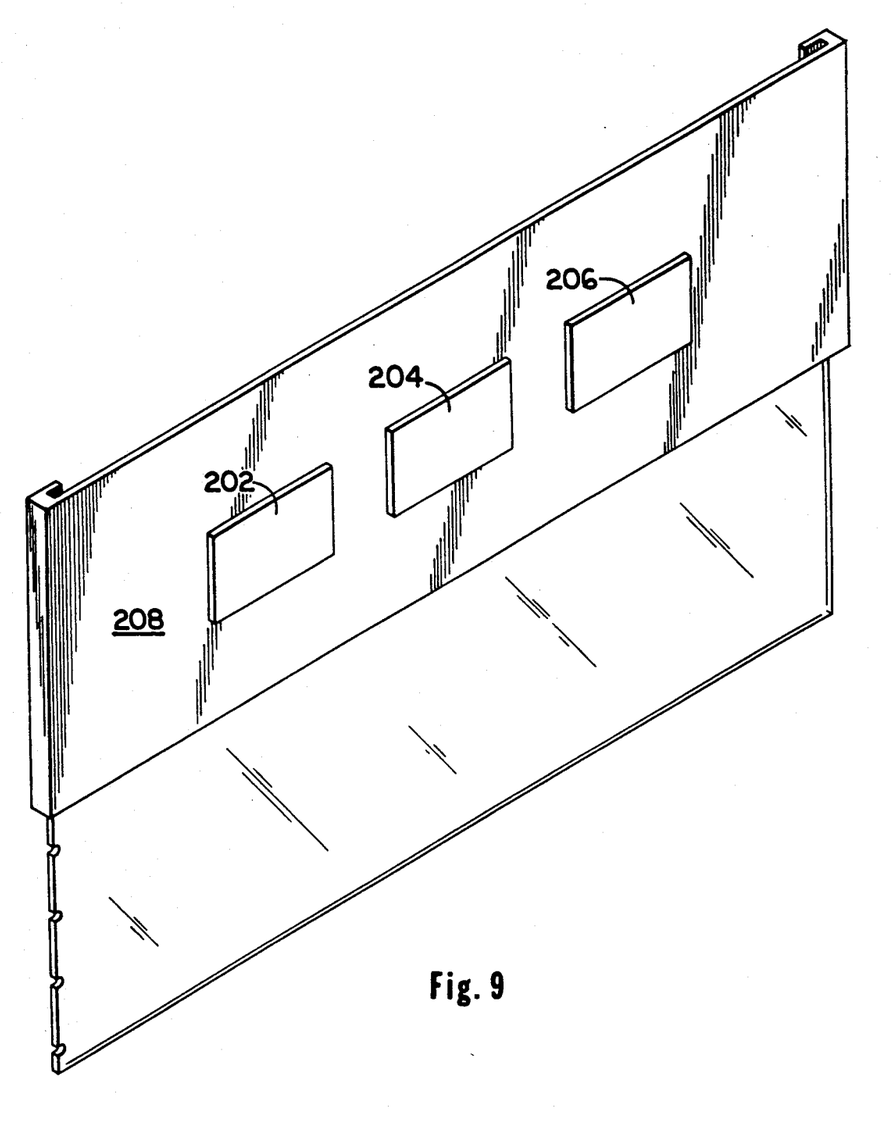
FIG. 9 is a perspective view of a third embodiment of the visor attachment of this invention illustrating a different method of attachment.

A third embodiment of the visor attachment differs only in the method of attachment to the conventional visor, and is illustrated in FIG. 9. This third embodiment may use either of the foregoing methods of moving and securing the slidable panel in place. A plurality of strips of VELCRO ® 202, 204 and 206 is adhesively attached to the non-operating side of fixed panel 208. A panel of matching VELCRO ® (not shown) is adhesively attached to the conventional visor (not shown). The VELCRO ® strips on fixed panel 208 and on the conventional visor are simply pressed against each other for firm attachment.

Figures 10, 11:
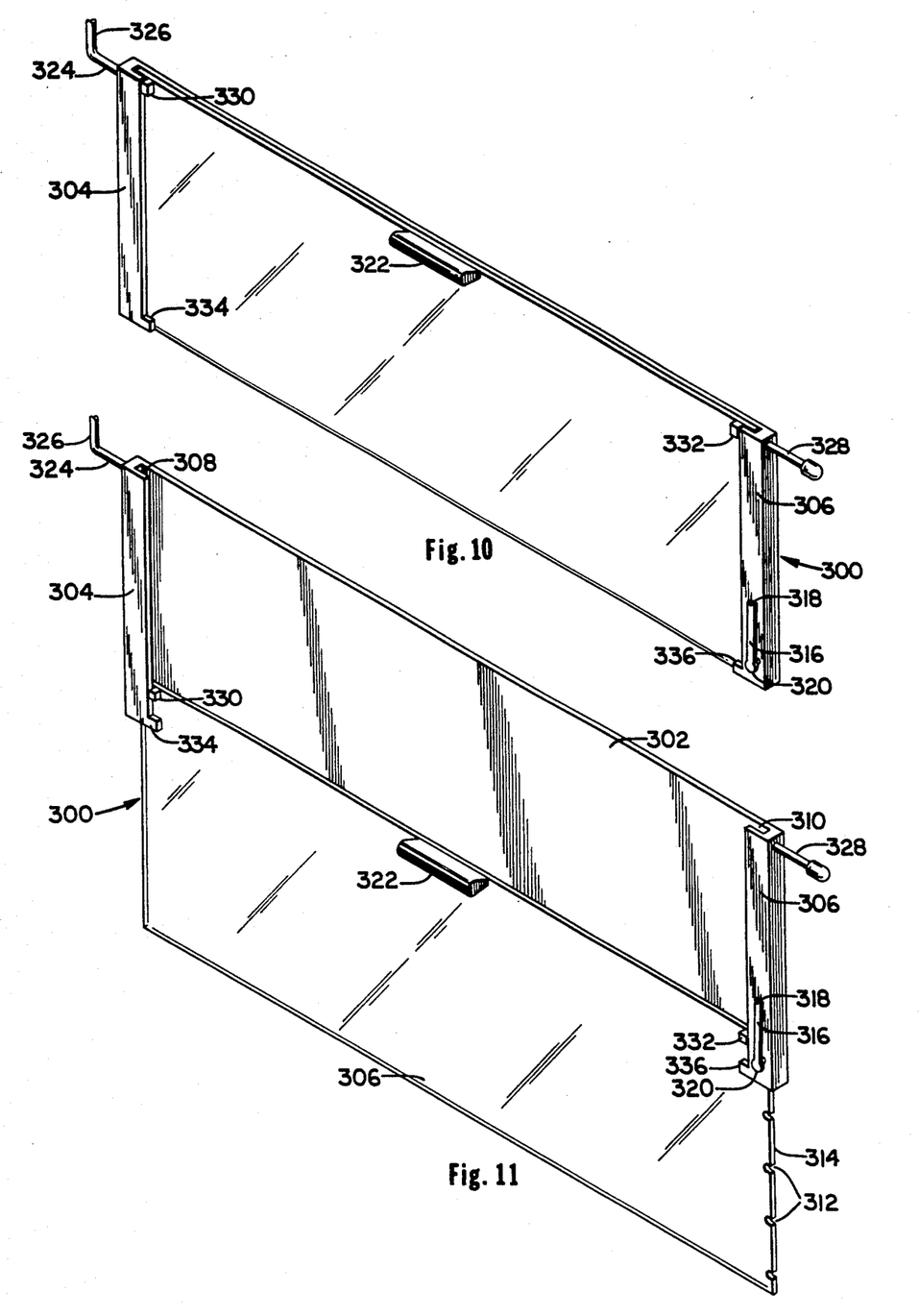
FIG. 10 is a perspective view of a fourth embodiment of this invention illustrating a complete replacement visor with the movable panel fully retracted.
FIG. 11 is a perspective view of the fourth embodiment of this invention with the movable panel fully extended.

A fourth embodiment of this invention is a full replacement windshield visor 300 as illustrated in FIGS. 10 and 11. A fixed panel 302 has inwardly directed flanges 304 and 306 forming slots 308 and 310. The slidable panel fits slidably within slots 308 and 310. The arrangement for holding slidable panel 304 in a selected position is the same as in the second embodiment, featuring cutouts 312 in one end 314 of slidable panel 304. Flexible stop clip 316, fixed at end 318, operates through a suitable slot in flange 306. A spherical element (not shown) at lower end 320 of clip 316 partially engages cutouts 312 to hold slidable panel 304 in position. Handle 322 is used to move slidable panel 304 within slots 308 and 310. Mounting rod 324 extends longitudinally from one end of fixed panel 302.

Mounting rod 324 has an upward extending element 326 which attaches rotatably to the conventional visor mounting bracket (not shown). Mounting rod 324 is pivotally attached to fixed panel 302. Rod 328 extends longitudinally from fixed panel 302 at the opposite end from mounting rod 324. Rod 328 is suitable for insertion into a clip (not shown) to hold the visor 300 in its normal position. Stops 330 and 332 rest on shelves 334 and 336 respectively when slidable panel 304 is fully extended from fixed panel 302. It will be recognized that this fourth embodiment could also utilize the opposed serration method of positioning the movable panel 306.

While this invention is susceptible of embodiment in different forms, the drawings and the specification illustrate preferred embodiments of the invention, with the understanding that the present disclosure is to be considered an exemplification of the principles of the invention, and the disclosure is not intended to limit the invention to the particular embodiments described.

I claim:

1. A windshield visor attachment comprising:
   a conventional windshield visor:
   a first rigid rectangular panel;
   a second rigid rectangular panel slidable within and capable of extending downward from the first panel;
   a means for fastening the visor attachment to the conventional windshield visor, said means comprising screws penetrating the conventional windshield visor, said screws being fastened to the first panel; and
   a means to move the second panel to a selected position and to retain the second panel in the selected position, said means comprising;
   two series of inward-facing opposing serrations formed on the first panel; and
   extendible rods attached to the second panel and engageable within the opposing serrations.

2. The visor attachment of claim 1 wherein the means for positioning the second panel comprises a detent mounted on the first panel and cooperating with a plurality of cutouts in the second panel.

3. The visor attachment of claim 1 wherein the second panel is opaque, mirrored, transparent, tinted or photogray.

4. A windshield visor comprising:
   an attachment rod adapted to cooperate with a windshield visor mounting bracket in a rotatable relationship;
   a first rigid rectangular panel rotatably attached to the rod;
   a second rigid rectangular panel slideable within and capable of extending downward from the first rigid panel; and a means to move the second panel to a selected position and to retain the second panel in the selected position, said means comprising;
   two series of inward-facing opposing serrations formed on the first panel; and
   extendible rods attached to the second panel and engageable within the opposing serrations.

5. The visor of claim 4 wherein the means for positioning the second panel comprises a detent mounted on the first panel and cooperating with a plurality of cutouts in the second panel.

6. The visor of claim 4 wherein the second panel is opaque, mirrored, transparent, tinted or photogray.

* * * * *